Aug. 2, 1955     J. G. AGUILAR ET AL     2,714,411

CHERRY STEMMING AND SORTING MACHINE AND METHOD

Filed May 16, 1951     3 Sheets-Sheet 1

Fig. 1

INVENTORS
JOHN G. AGUILAR &
WILLIAM A. COX

Aug. 2, 1955   J. G. AGUILAR ET AL   2,714,411
CHERRY STEMMING AND SORTING MACHINE AND METHOD
Filed May 16, 1951   3 Sheets-Sheet 2

INVENTORS
JOHN G. AGUILAR &
WILLIAM A. COX

United States Patent Office 2,714,411
Patented Aug. 2, 1955

2,714,411

CHERRY STEMMING AND SORTING MACHINE AND METHOD

John G. Aguilar and William A. Cox, San Francisco, Calif.

Application May 16, 1951, Serial No. 226,554

29 Claims. (Cl. 146—238)

This invention relates to a cherry stemming and sorting machine and is a continuation in part of our copending applications Serial Nos. 45,628 and 123,489 respectively filed August 23, 1948 and October 25, 1949, both now abandoned, and is substituted for said applications.

One of the objects of the invention is the provision of a machine that is adapted to stem fruit, such as cherries and the like, more rapidly and efficiently than heretofore and without injury to the fruit.

Another object of the invention is the provision of a machine that is adapted to be quickly converted from a machine for stemming cherries to a machine for separating stemmed cherries from unstemmed cherries, and which machine is simple, economical to make and more efficient than heretofore.

Heretofore various types of machines have been devised for stemming cherries, most of which include a conveyor that supports the cherries or the like for movement along a path of travel or along different paths, and at some point along said path or one of said paths, a stem gripping device separate from the conveyor is intended to grip the stems and pull them from the cherries. The employment of such separate stem gripping device usually involves belts, that may be round, and that are brought together against opposite sides of the stems so as to frictionally engage the stems, and then these separate stem pinching belts and the fruit carrier are moved away from each other so as to pull the stems from the fruit. Such systems require the stems to all be positioned in substantially the same direction and such stems must also project substantially straight outwardly of the carrier so as to enable them to be pinched between the devices intended for said purpose. The impossibility of arranging the cherries so that their stems will be positioned for grasping by the stem gripping or pinching devices has resulted in a great many cherries or other fruit not being stemmed. Sufficient operators must then be employed to inspect the fruit and to remove the unstemmed fruit.

With the present invention, practically all of the fruit is stemmed even where the stems are quite short, and where they are so short that the conventional devices heretofore used are incapable of gripping the stems. This result is accomplished by utilizing the conveyor elements required for moving the cherries or fruit along a path of travel when their stems are attached, and devices independently of such conveyor are not required.

Heretofore, attempts to stem fruit such as cherries have also been along the line of mechanisms designed to tumble the unstemmed cherries about in a carrier having openings or slots in its walls through which the stems are intended to project and to be caught by gripping means, while other attempts require rolling the cherries along a path of travel until their stems come into a position where they may be gripped by a gripping means.

The rolling and tumbling of fruit is objectionable in that the fruit is liable to injury and the surfaces over which they roll or move become sticky and gummy. Also many cherries do not roll or move into the desired position for the stems to be gripped, and such cherries will not be stemmed.

With the present invention, the rotation or movement of the cherries is reduced to a minimum, and the stems will be gripped irrespective of whether the stems are downwardly or upwardly directed, and the structure of the device is such that they are certain to be in one or the other of such two positions only.

Another object of the invention is the method of stemming cherries or the like, by supporting the cherries for movement along a predetermined path of travel with their stems directed upwardly and downwardly and without causing substantial movement of said cherries about their axis, and then gripping the projecting stems and separating the cherries from the gripped stems. The method may also include the step of separating the cherries with their upwardly projecting stems from those having downwardly projecting stems, and then separating the cherries from their stems.

Other objects and advantages will appear in the description and in the drawings.

In the description and claims, the use of the words "cherries" or "cherry" is not intended to restrict the invention in its use, inasmuch as it is adapted for use wherever the fruit has stems that project from fruit units in a manner similar to cherry stems. The machine may also obviously be larger or smaller according to the fruit to be handled.

Figure 1:
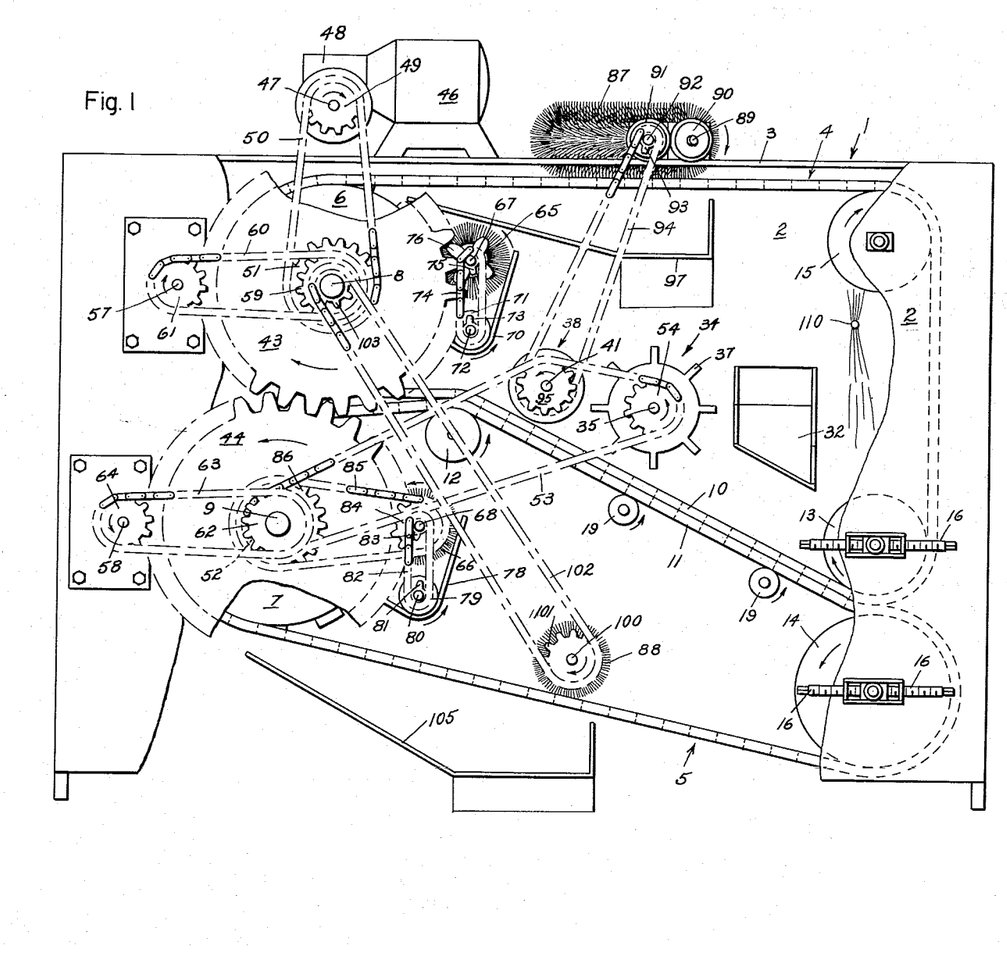
Fig. 1 is a side elevational view of the stemming machine with part of the near side broken away to show interior structure, but with the driving chains and gears at the near side indicated.
Figures 2, 3:
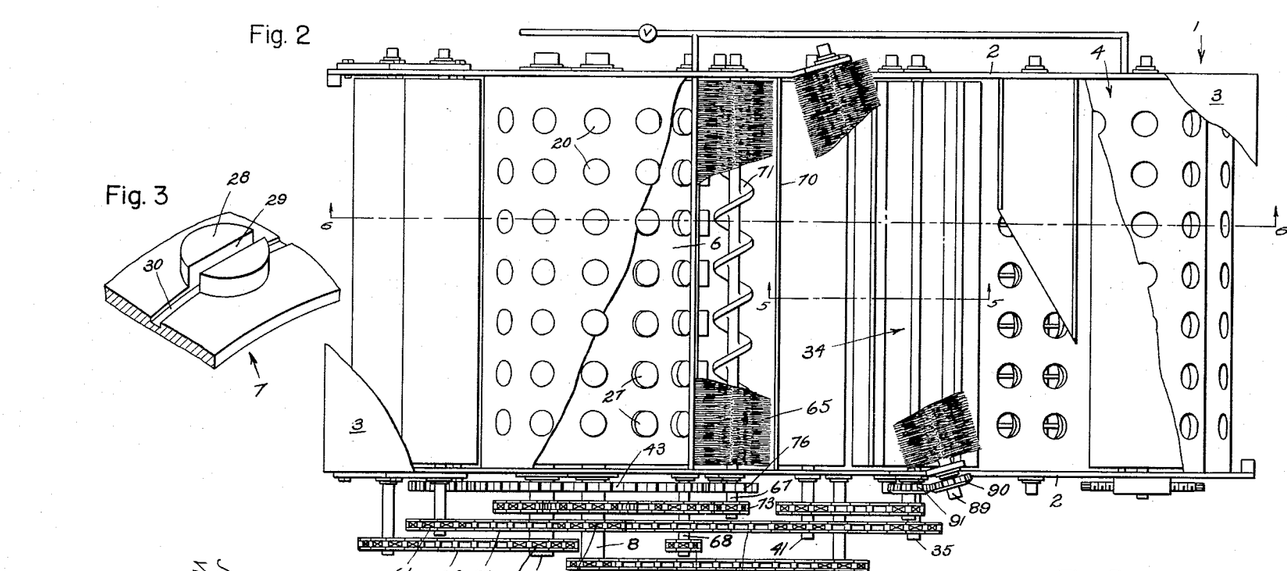
Fig. 2 is a top plan view of the machine with the top side broken away to show internal structure, and with other parts broken away to reveal structure therebelow.
Fig. 3 is an enlarged fragmentary perspective view, partly in section, showing one of the projections on a lower pulley or drum at one end of the machine over which the lower conveyor belt extends.

In the drawings, the numeral 1 is used to generally designate the frame of the machine wherever shown, and in Figs. 1, 2 the frame is illustrated as comprising opposed side plates 2 and a top plate 3 connecting the latter. These side plates may carry the bearings for the pulleys, rollers, etc. that extend therebetween.

Two endless belt conveyors generally designated 4, 5 are used, the conveyor 4 being above conveyor 5. Pulleys or drums 6, 7 are disposed one above the other at one of the corresponding ends of the belt and are on horizontal shafts 8, 9 that are carried in bearings supported on the side frame members 2.

Figure 6:
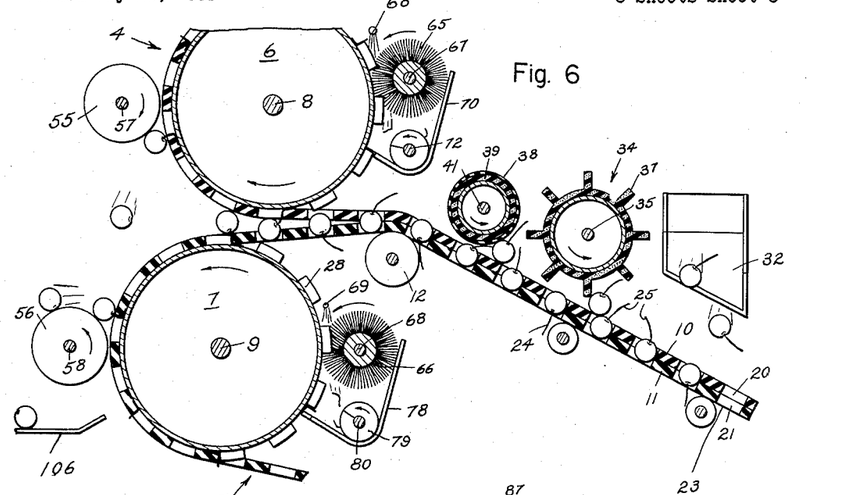
Fig. 6 is an enlarged, fragmentary, semi-diagrammatic sectional view taken substantially along line 6—6 of Fig. 2.

The upper conveyor has a lower run 10 and the lower conveyor has an upper run 11, both of which runs extend in the same direction from the adjacent lower and upper sides of pulleys 6, 7. As seen in Figs. 1 and 6 they extend to the right for a relatively short distance, and convergently relative to each other until they meet at an idler pulley 12 over which they extend.

From the idler pulley 12, the lower and upper runs extend slantingly downwardly, but in a generally horizontal direction, and in engagement with each other to upper and lower pulleys 13, 14 over which they extend.

The lower run of the upper belt extends upwardly from pulley 13 to a pulley 15, and over the latter, and then back to the upper side of pulley 6 and over the latter.

The upper run 11 of the lower belt 5 extends over pulley 14, then downwardly and back to the pulley 7 and below the latter. Pulleys 13, 14 are idler pulleys and their shafts are supported in movable blocks adjustable by screws 16 whereby said pulleys may be moved as required for tightening the belts.

The portions of belts 4, 5 that extend between the roller 12 and pulleys 13, 14 are straight and are in engagement with each other. Idler rollers 19 may be positioned below said portions at spaced points for supporting them, or any other suitable means may be provided that will function for substantially the same purpose.

The pulleys or drums 6, 7 are relatively large in diameter as compared with the other pulleys over which the belts extend, and the upper pulley 6 is offset slightly relative to the pulley 7 therebelow in direction toward roller 12. The reason for this will be explained later. Also the pulley 14 is preferably larger in diameter than the pulley 13 that is above it. The provision of the third pulley 15 over which belt 4 extends spaces the upper and lower runs of the belt 4 sufficiently to provide an enlarged space between said runs in which other parts of the machine are adapted to be positioned.

The upper and lower belts 4, 5 are respectively formed with circular perforations 20, 21 (Fig. 6) each of which is adapted to receive a single cherry 22 therein. The perforations 20, 21 are in register with each other along the adjacent, engaging runs of said belts, and as the thickness of each belt is equal to about half the diameter of each cherry, it will be seen that when a cherry 22 is within each pair or registering perforations, its upper and lower sides will be about even with the upper and lower sides of the lower and upper adjacent runs of belts 4, 5.

The perforations in said belts 4, 5 are in parallel rows extending longitudinally of said belts, and strips 23 (Fig. 4) secured to the inner side of the lower belt 5 extend longitudinally of said lower belt and centrally across the perforations of each row leaving a relatively large space at the opposite sides of each strip at each perforation for the stems 24 of cherries to project downwardly from the upper run of the lower belt when cherries having their stems directed downwardly are deposited in the registering pairs of perforations where the adjacent runs of the belts are together. Of course, the cherries that have their stems directed laterally or upwardly will have their stems projecting upwardly from the upper side of the lower run of belt 4 when such cherries drop onto the pairs of registering openings. The upwardly projecting stems in Fig. 6 are designated 25.

Figure 4:
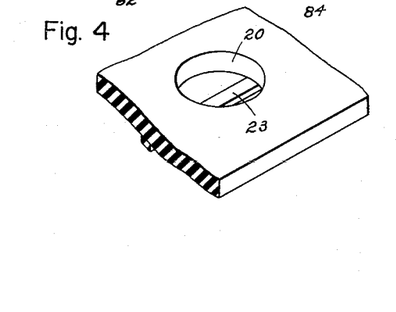
Fig. 4 is an enlarged fragmentary perspective view, partly in section, of the lower conveyor belt showing one of the perforations that receives one of the projections seen in Fig. 3.
Figure 5:
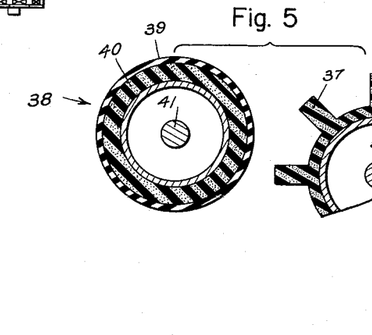
Fig. 5 is a vertical sectional view through a rotor and roller used in the machine, the section being taken along 5—5 of Fig. 2, and the rotor and roller being separate from the rest of the machine.
Figure 7:
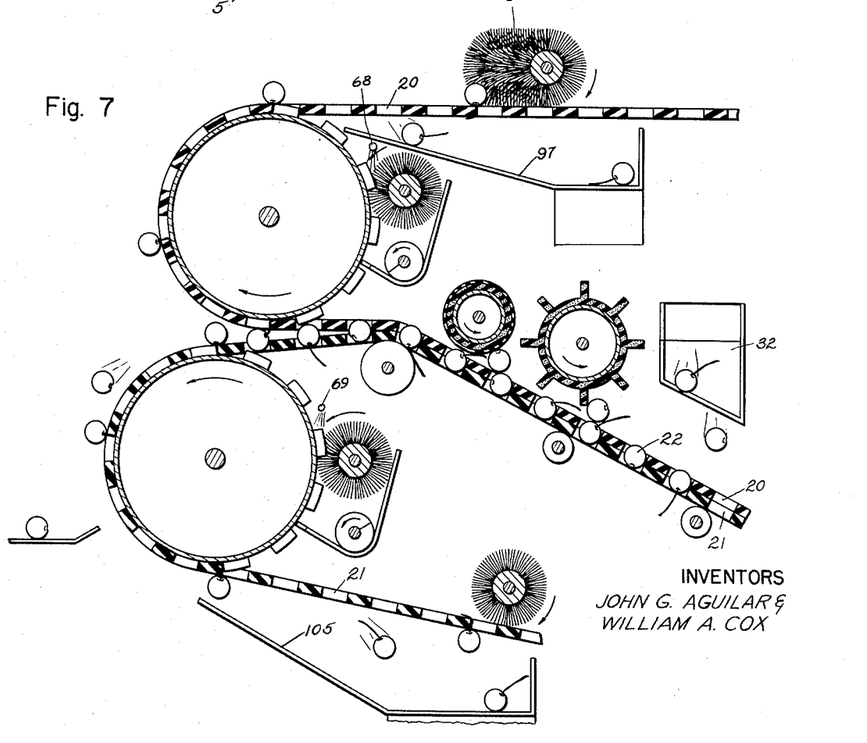
Fig. 7 is a view substantially the same as that of Fig. 6, except with the stemming rollers omitted and with receivers added when the machine is used for sorting stemmed from unstemmed cherries.

The cherries that are deposited in the pairs of registering openings that are in the adjacent runs of belts 4, 5 will be supported on strips 23. In Figs. 6, 7 the strips 23 are indicated by heavy black lines instead of in cross section. In Fig. 4 the structure is clearly shown. The strips 34 are flexible, and may be of the same material as that of the belt.

The pulley or drum 6 is formed with outwardly projecting knobs or projections 27, so spaced, positioned and shaped as to enter the perforations 20 as the belt moves over the pulley. The corners of these projections are preferably rounded slightly so as to readily enter the perforations, and they do not fit the perforations so tightly as to sever the stems of the cherries that also enter said perforations, as will be explained later.

The pulley or drum 7 over which one end of the lower belt 5 extends has projections 28 (Fig. 3) that are the same as projections 27 except that they are centrally recessed at 29 to receive the strips 23 on the inner side of the belt 5, and the outer surface of the pulley 7 may also be formed with circumferentially extending grooves 30 that are in alignment with the recesses 29 for receiving said strips. In this maner the inner side of the belt will be flat against the pulley or drum 7.

The projections 27 and 28 are substantially of the same depth as the thickness of belts 4, 5 hence do not project outwardly of said belts.

Positioned to feed cherries over the adjacent engaging runs 10, 11 of belts 4, 5 and adjacent to the pulley 13, is a feed chute 32 that may extend through a side 2 of the frame. This chute or cherry feeding means is between the upper and lower recess of the upper belt 4, and may be formed at its outer end to distribute the cherries over the lower run 10 of belt 4. It is immaterial if the cherries pile up to a slight extent on the lower end of the lower run 10, inasmuch as they will tend to roll down the belt unless in a pair of the registering perforations 20, 21. As soon as a cherry is in a pair of such perforations, it will be bodily carried by the conveyor without further movement about its axis.

If the stem of the cherry projects upwardly when it drops into a pair of registering perforations, the stem will project upwardly from the upper side of the lower run 10 of the upper belt as indicated at 25 and if the stem projects downwardly, it will pass to one side or the other of the strip 23 that extends centrally across the lower side of each perforation 21 in the upper run 11 of the lower belt, and will project downwardly from the lower side of run 11 as indicated at 24. Any cherries having their stems projecting laterally when they are over a pair of said registering perforations will automatically rotate so that they will project upwardly as the cherries drop into such perforations.

Between the delivery point of the chute 32 and the pulley 12 that defines the upper ends of the portions of the belts that are in engagement with each other, is a rotor generally designated 34. This rotor is horizontally elongated and extends transversely across the lower run 10, being on a shaft 35 that is supported for rotation at its ends in bearings carried by the side frame members 2. The rotor 34 is provided with equally spaced vanes 37 that extend longitudinally thereof, and which ribs are preferably of relatively soft resilient rubber, of about the same hardness characteristic as that of the rubber commonly used for automobile inner tubes. The depth of the vanes 37 radially of the rotor is substantially equal to the diameter of a cherry and the spacing between ribs is preferably greater than such diameter. The vanes themselves are sufficiently thick circumferentially of the rotor to be self supporting and to prevent cherries carried on said run 10 and out of the perforations from passing them when one of said vanes is lowermost and adjacent to the said run 10. The rotor is positioned so that the outer edges of the vanes will just clear the belt.

In describing the means for actuating the machine, the means for rotating the rotor 34 will be described, but at this time it is sufficient to say that it is rotated in a direction so that the vanes nearest the run 10 will move in a direction opposite to the direction of movement of the belt. The purpose of the rotor is to prevent cherries that are not in the perforations from passing the rotor and said rotor also functions very efficiently in separating clusters, particularly where one of the clusters is in a pair of said registering perforations.

Inasmuch as it is possible for a cherry to slip past the rotor at times, a roller 38 is positioned between the rotor 34 and the point where the pulley 12 extends below runs 10, 11.

This roller 38 is power driven for rotating in the same direction as the rotor 34, and it preferably has another layer 39 of relatively soft rubber of the same characteristic as the rubber of vanes 35. However, a layer 40 of sponge or foam rubber may be between the outer layer 39 and the rigid body of the roller, the latter being preferably a metal cylinder with heads securing it to the central shaft 41. Shaft 41, like shaft 35 of the rotor, is rotatably supported at its ends in bearings carried by the side frame members 2.

While the provision of the projections 27, 28 on pulleys or drums 6, 7 will tend to maintain the perforations in the adjacent engaging portions 10, 11 of the belts 4, 5 in registration with each other when one or the other of the belts is directly driven, there is also a tendency for one of the belts to creep ahead of the other. Position registration of the perforations is assured by providing identical gears 43, 44 on one of the ends of shafts 8, 9 with their teeth in meshing relationship, and these gears also function to hold the pulleys 6, 7 in the correct spaced relationship at all times. This spacing of the pulleys or drums 6, 7 is quite important and the adjacent sides of the belts at the adjacent sides of said pulleys is important.

A motor 46 carried on frame 1 is connected with a driven shaft 47 through a suitable gear box 48 (Fig. 1). A sprocket wheel 49 is secured on shaft 47, which sprocket wheel is connected by a sprocket chain 50 with a larger diameter sprocket wheel 51 that is secured on shaft 8.

As already mentioned, gears 43, 44 have their teeth in meshing relationship, hence the rotation of shaft 8 by the chain 50 when the motor is actuated will cause gears 43, 44 and pulleys 6, 7 to rotate at identically the same speed and the belts 4, 5 will have identically the same surface speed.

A sprocket wheel 52 on shaft 9 connects by a sprocket chain 53 with sprocket wheels 54, 55 that are respectively secured on shafts 35, 41 that in turn are the shafts for rotor 34 and roller 38. Rotation of the shaft 9 will, therefore, cause the rotor 34 and roller 38 to rotate in the direction already explained for preventing cherries that are not within the registering pairs of openings 20, 21 from reaching the pulleys or drums 6, 7.

When the cherries having their stems 25 projecting upwardly or having their stems 24 projecting downwardly, pass over the pulley 12, the belts will commence to diverge. However, this divergence is relatively slight, and the space between the strips 23 on the upper run of the lower belt on which the cherries are supported, and the outer surfaces of the projections 27 on the upper pulley when said projections are lowermost and are in a vertical line that extends through the axis of shaft 8, is substantially equal to the diameter of a cherry. As already explained, the lower pulley 7 is offset beyond the pulley 6, hence it is impossible for a cherry to be squeezed between projections 27, 28 at the adjacent sides of pulleys 6, 7. If extra large cherries should be carried to the pulleys or drums 6, 7 they would be supported on the resilient and elastic strips 23 at the time any pressure from the projections 27 would be on them.

The upwardly projecting stems 25 are gripped between the upper pulley or drum 6 and the belt 4 and the downwardly projecting stems 24 are gripped between the lower pulley 7 and the belt 5 upon the cherries in the registering openings 20, 21 being carried to said pulleys. The stems extend past the projections 27 or 28 as the case may be and once the stems are gripped the cherries will be suspended by their stems with the latter extending through the perforations in the belts as the cherries are carried upwardly around pulleys 6, 7.

The projections 27, 28 insure the cherries moving out of the perforations in the belts to positions in which they are carried around the pulleys in paths of travel that are adjoining but just outside the belt 4, 5 where the latter extend around the pulleys. Even were the projections on the pulleys to be omitted, at least half of each cherry would project beyond each belt according to which one grips the stem, and in the case of the upper pulley and belt, the cherries would be wholly suspended from their stems as the belt 4 starts its upward movement around the upper pulley 6. However, the use of the projections 27, 28 is preferable since it positively insures the cherries being moved completely out of the perforations in the belts.

Alongside the pulleys 6, 7 at the sides thereof around which belts 4, 5 extend, are horizontally elongated knock off members 55, 56, in the form of power driven rollers. Roller 55 is about half way up the side of upper pulley 6 and roller 56 is about half way down the outer side of lower pulley 9. They are covered with rubber preferably of about the same kind as covers the roller 38, and the said rollers are respectively secured on shafts 57, 58 that are rotatably mounted at their ends in bearings carried by the side frame members 2.

A sprocket wheel 59 on shaft 8 connects by a sprocket chain 60 with a sprocket wheel 61 secured on the shaft 57 that carries the upper roller 55. This connection causes the roller 55 to rotate in the same direction as pulley 6, which means that the side of the roller 55 that is adjacent to the pulley 6 will move in a direction opposite to the direction of movement of the belt and pulley that is adjacent thereto. Any cherries carried upwardly around the outer side of the pulley 6 will be engaged by the roller 55 which removes such cherries from their stems, the stems being carried on around the pulley or drum 6. The outer surfaces of rollers 55, 56 respectively, are closely adjacent to the outer sides of belts 4, 5 where the latter move around pulleys 6, 7.

A sprocket wheel 62 secured on the lower pulley shaft 9 connects by a sprocket chain 63 with a sprocket wheel 64 that is secured on the lower roller shaft 58, and this connection causes the roller 56 to rotate in a direction for tending to move the cherries outwardly away from the lower belt 5 when they are separated from their stems by engagement with roller 56. The stems are then carried by belt 5 past the roller 56 to below the pulley 7.

At the sides of pulleys 6, 7 that are opposite the rollers 55, 56 are rotary brushes 65, 66, the brush 65 being alongside pulley 6 and brush 66 being alongside the lower pulley 7. These brushes are respectively secured on shafts 67, 68 that in turn are rotatably supported at their ends in bearings carried by side frame members 2. Brushes 65, 66 are horizontally elongated with their bristles in engagement with the outer surfaces of the pulleys 6, 7 including projections 27, 28. Their function is to clean the pulleys. Stems and other foreign material may stick to the pulleys and also water spray pipes 68, 69 (Figs. 7, 6) may extend alongside the pulleys just above the engaging sides of the brushes and pulleys for washing impurities from the pulleys.

Below brush 65 is a trough 70 that is adapted to receive the stems and foreign material that may be removed from pulley 6, and a screw conveyor 71 in the bottom of said trough will continuously move the stems longitudinally of the trough and out of the same through an opening in one side 2 of the frame 1. This screw conveyor is on a shaft 72 that is rotatably supported at its ends in bearings carried by the side frame members 2.

A sprocket wheel 73 is secured on one end of the shaft 72, and a sprocket chain 74 connects said wheel 73 with a sprocket wheel 75 that is secured on one end of the brush shaft 67. Shaft 67 has a pinion 76 secured thereto, the teeth of which are in mesh with the teeth of gear 43. Upon actuation of gear 43 the brush will clean the pulley 6 and the stems and impurities removed will be continuously removed.

Below brush 66 is a trough 78 that is identical with trough 70. A screw conveyor 79 on a shaft 80 is in the bottom of trough 78 and functions to continuously remove from the trough the stems and impurities that are removed from the pulley 7.

A sprocket wheel 81 secured on shaft 80 connects by a sprocket chain 82 with a sprocket wheel 83 that is on shaft 68. Inasmuch as the movement of the side of brush 66 that engages the side of pulley 7 should be downward, the said movement is effected by means of a sprocket wheel 84 on shaft 68, which sprocket wheel is connected by a sprocket chain 85 that connects with a sprocket wheel 86 secured on shaft 9.

It is likely that some stems will also adhere to the belts 4, 5. It is, therefore, desirable to provide rotary brushes 87, 88 respectively along and over the upper run of the upper belt and along and over the lower run of the lower belt.

For a reason later to be described, the brush 87 preferably extends diagonally across the upper side of the upper run of belt 4. This brush is on a shaft 89 that is rotatably mounted at its ends in bearings secured to frame 1, and the bristles of the brush contact said belt. A bevel gear 90 secured on one end of shaft 89 has its teeth in mesh with a gear 91 that is secured on a stub shaft 92, also rotatably secured to frame 1. A sprocket wheel 93 secured on shaft 92 is connected by a sprocket chain 94 with a sprocket wheel 95 secured on shaft 41, hence the brush is driven by rotation of the shaft 41 that carries roller 38.

The direction of rotation of the brush 87 is such that the direction of movement of the side that engages the belt is opposite to the direction of movement of the upper run of belt 4. Any stems that might adhere to belt 4 after the cherries have been removed will fall from said belt onto a chute receiver 97 which also may open outwardly of a side of the machine so that the cherry stems can be removed therefrom.

The lower brush 88 may extend directly across the lower run of belt 5 and this brush is on a shaft 100 that is journalled in bearings on the frame 1 at its ends. One end of the shaft 100 carries a sprocket wheel 101 that is connected by a sprocket chain 102 with a sprocket wheel 103 that is, in turn, secured on shaft 8. The rotation of brush 88 is such that the direction of movement of its side that engages the upper side of the lower run of the lower belt will be opposite to the direction of movement of said lower belt.

Stems and impurities that are removed by the brush 88 will fall into a receiver 105 below said belt for removal therefrom through any suitable opening in a side 2 of the frame 1.

As seen in Fig. 6, the cherries from which the stems have been removed may be caught by any suitable chute or hopper 106 that in turn may deliver the cherries on to a conveyor of any suitable stand (not shown) for delivery to any desired point. A receiving chute may be positioned to receive the stemmed cherries from both the upper and lower belts, if desired. Only one receiver is shown in the drawings, and this one receives the cherries from both belts.

It is pertinent to note that the apparatus disclosed may function as a separator for stemmed and unstemmed cherries instead of a stemming machine by removing the rollers 55, 56.

The cherries that are fed onto the engaging runs 10, 11 of the belts from feed device 32 usually include many that have already become separated from their stems. These will obviously fall from the lower belt when the latter moves around the lower pulley 7.

At the present time, there is a considerable demand for preserved or maraschino cherries that have their stems attached. These cherries are bottled or canned and are, for the most part, used in cocktails. They command a higher price than the stemmed cherries, hence it is important that they be separated from the cherries having no stems.

When the rollers 55, 56 are removed, the cherries having their stems caught between the pulleys 6, 7 and belts 4, 5 will be carried around the pulleys 6, 7 and will be released as soon as the belts leave the pulleys. The cherries that are so carried by the lower belt will drop into the receiver 105 and the cherries that are carried upwardly by the upper belt will be brushed off the said belt into receiver 97 that extends through the near side of the frame of Fig. 1 and an end wall 109 on said chute may extend above the level of the upper run of belt 4 to prevent the cherries from being swept over the chute. The diagonal position of the brush 87 will effect the removal of said unstemmed cherries into the receiver 97.

Water spray pipes may be positioned wherever desired in the machine. One such pipe is indicated at 110 in Fig. 1 between pulleys 13, 15 and another may be positioned to clean pulley 14.

The operation of the machine is believed to be clear from the description. The cherries are supported for bodily movement to the pulleys 6, 7 and against rotation about their axes during such movement, and said cherries do not require any positioning devices or the like so that all their stems will be directed upwardly or downwardly or in any other direction.

The said stems are gripped as the cherries move along their respective paths of travel and are suspended from the stems after the latter are so gripped so that an obstruction placed in the paths of travel of the cherries will separate them from their stems. The elongated members or rollers 55, 56 provide such obstructions, and the projections on the pulleys positively push the cherries out of the perforations in the belts so they will be effectively engaged by the rollers, when the machine functions as a stemmer.

We claim:

1. A machine for stemming fruit and the like comprising: a pair of conveyor belts mounted one on top of the other for a portion of their lengths and having a plurality of perforations therein to receive and to carry fruit with its stems extending outwardly thereof, an elongated member extending transversely of said belts and spaced from one side of one of said belts a distance less than the diameter of said fruit to engage the latter, a drum mounted for rotation on the other side of said one of said belts and contacting said one of said belts, means causing said belts to diverge from one another at a point along the path of travel of said one of said belts between the points where said one of said belts contacts said drum and where said one of said belts passes said elongated member, means for moving said one of said belts and the fruit carried thereby over said drum whereby the stems of said fruit are frictionally engaged between said drum and said one of said belts and pulled from said fruit when said fruit contacts said elongated member, a second elongated member extending transversely of said belts and spaced from one side of the other of said belts a distance less than the diameter of said fruit, a second drum mounted on the other side of said other of said belts and contacting said other of said belts, means for moving said other of said belts and the fruit carried thereby over said second drum whereby the stems of said fruit are frictionally engaged between said second drum and said other of said belts and pulled from said fruit when said fruit contacts said elongated member.

2. A machine for stemming fruit and the like comprising: a pair of conveyor belts mounted one on top of the other for a portion of their lengths and having a plurality of perforations therein to receive and to carry fruit with its stems extending outwardly thereof, an elongated member extending transversely of said belts and spaced from one side of one of said belts a distance less than the diameter of said fruit to engage the latter, a drum mounted for rotation on the other side of said one of said belts and contacting said one of said belts, means causing said belts to diverge from one another at a point along the path of travel of said one of said belts between the points where said one of said belts contacts said drum and where said one of said belts passes said elongated member, means for moving said one of said belts and the fruit carried thereby over said drum whereby the stems of said fruit are frictionally engaged between said drum and said one of said belts and pulled from said fruit when said fruit contacts said elongated member, a second elongated member extending transversely of said belts and spaced from one side of the other of said belts a distance less than the diameter of said fruit, a second drum mounted on the other side of said other of said belts and contacting said other of said belts, means for moving said other of said belts and the fruit carried thereby over said second drum whereby the stems of said fruit are frictionally engaged between said second drum and said other of said belts and pulled from said fruit when said fruit contacts said elongated member, means mounted adjacent to said belts and aligned with said perforations for maintaining the fruit in the perforations in said belts.

3. A machine for stemming fruit and the like comprising: a pair of endless conveyor belts having a plurality of perforations therein to receive and carry fruit with its stems extending outwardly thereof, means supporting said belts for common movement one on top of the other for a portion of their lengths, means causing said belts to diverge from one another after receiving said fruit, a pair of elongated members each of which is positioned transversely of a corresponding one of said belts at a point along the path of travel along said corresponding one of said belts after it has diverged from the other for engaging said fruit, a pair of drums each of which is mounted for rotation in and contact with an associated one of said belts and on the side of said belt opposite from the associated one of said elongated members, means for moving each of said belts and the fruit carried thereby past the associated one of said drums and elongated members whereby the stems of said fruit will be frictionally engaged between one of said belts and its associated drum and will be pulled from said fruit when said fruit engages the associated one of said elongated members.

4. A machine for stemming fruit and the like comprising: a pair of endless conveyor belts having a plurality of perforations therein to receive and carry fruit with its stems extending outwardly thereof, means supporting said belts for common movement one on top of the other for a portion of their lengths, means causing said belts to diverge from one another after receiving said fruit, a pair of elongated members each of which is positioned transversely of a corresponding one of said belts at a point along the path of travel along said corresponding one of said belts after it has diverged from the other for engaging said fruit, a pair of drums each of which is mounted for rotation in contact with an associated one of said belts and on the side of said belt opposite from the associated one of said elongated members, means for moving each of said belts and the fruit carried thereby past the associated one of said drums and elongated members whereby the stems of said fruit will be frictionally engaged between one of said belts and its associated drum and will be pulled from said fruit when said fruit engages the associated one of said elongated members, each of said belts having a thickness substantially equal to one-half the diameter of said fruit.

5. A machine for stemming fruit and the like comprising: a pair of endless conveyor belts having a plurality of perforations therein to receive and carry fruit with its stems extending outwardly thereof, means supporting said belts for common movement one on top of the other for a portion of their lengths, means causing said belts to diverge from one another after receiving said fruit, a pair of elongated members each of which is positioned transversely of a corresponding one of said belts at a point along the path of travel along said corresponding one of said belts after it has diverged from the other for engaging said fruit, a pair of drums each of which is mounted for rotation in contact with an associated one of said belts and on the side of said belt opposite from the associated one of said elongated members, means for moving each of said belts and the fruit carried thereby past the associated one of said drums and elongated members whereby the stems of said fruit will be frictionally engaged between one of said belts and its associated drum and will be pulled from said fruit when said fruit engages the associated one of said elongated members, each of said elongated members being spaced from its associated belt a distance equal to less than the diameter of said fruit.

6. The method of stemming cherries and the like that comprises the steps of supporting unstemmed cherries in a layer substantially stationary relative to rotation about their respective axes for bodily movement of said cherries along a path of travel, positioning said cherries with the stems of some of said cherries in said layer projecting upwardly and with the stems of the remainder of said cherries projecting downwardly, moving said layer with the stems so positioned, gripping all of the said upwardly and downwardly projecting stems of said layer while said cherries are moving in said path and thereafter causing relative movement between the stems so gripped and the cherries in direction away from each other whereby said cherries will be pulled from said stems.

7. A machine for stemming cherries comprising: a horizontally disposed drum, means mounting said drum for rotation about its axis, an endless conveyor belt having a generally horizontally extending run extending to and below said drum and then upwardly and over said drum with one side in engagement with the latter, perforations formed in said belt each adapted to receive and to pass a cherry therethrough, cherry supporting means extending transversely across said perforations at the opposite side of said belt relative to said one side and along said generally horizontally extending run only, spaced from said opposite side a distance about half the diameter of said cherries for supporting said cherries with their upper halves in said perforations and with their stems projecting from said one side, means at said one side for feeding cherries to said perforations at a point along said run, means for moving said belt in a direction for moving the cherries in said perforations therewith to said drum for gripping of the said projecting stems between said drum and said one side whereby said cherries will be suspended by their stems and will project from said opposite side of said belt upon said upward movement of said belt over said drum, and means positioned in the path of said projecting cherries when so suspended and carried around said drum for obstructing their movement therepast whereby they will be separated from their stems.

8. A machine for stemming fruit comprising, a conveyor supported for movement in one direction along a predetermined path of travel and having oppositely outwardly generally vertically directed openings therein each adapted to pass a cherry therethrough, a portion of said conveyor in said path extending generally horizontally and a section thereof in continuation of said portion and in said path extending generally vertically with the openings directed laterally, a support below said portion for holding a cherry in each opening above said support with its stem projecting from the same side of said portion as the said section extends, said support being provided with an opening to permit each stem to so project, stem gripping means including said section at the same side of said section as said portion for gripping the projecting stems at about the juncture between said section and said portion and for holding said stem along said section, said support terminating at substantially said juncture whereby cherries in said section will be suspended from their stems, means for moving said conveyor in direction from said portion to said section, and means at a point alongside said section positioned for engagement with the cherries so suspended from their stems for separating them from said stems.

9. A machine for stemming cherries comprising a conveyor having a generally horizontally extending reach formed with holes therein each of which is adapted to receive a cherry therein with its stem projecting generally vertically from one side of said conveyor, a cylindrical rotary drum extending transversely across said conveyor and said holes in close engagement with said one side of said conveyor at one end of said reach, cherry supporting means associated with said holes and terminating adjacent to said drum for supporting each cherry therein for movement with said reach to said drum, means for actuating said conveyor for movement of said reach to and past said drum whereby said projecting stems will be caught and held between said conveyor and the outer surface of said drum, said holes opening outwardly of said conveyor relative to said drum for movement of said cherries out of said holes when said stems are so held and with said stems extending through said holes whereby said cherries may be engaged by means outwardly of said holes for separating the cherries from said stems, and means supported in a fixed position outwardly of said holes and alongside said drum at a point where said stems are so caught and held for engaging the cherries that are positioned outwardly of said holes and that have their stems between said conveyor and said drum.

10. A fruit stemming machine comprising an endless belt and a pair of spaced pulleys over which said belt extends with a length of said belt extending between said pulleys and with one side of said belt in close engagement with the outer surface of one pulley of said pair, means for actuating said belt for movement of said length to and past said one pulley, said belt being formed with holes each of which in said length is adapted to receive a cherry for movement therewith and with its stem projecting from the side of the belt that is adapted to engage said one pulley whereby each of said projecting stems will be caught and held between said belt and said outer surface of said one pulley for carrying each cherry in a path around the outer side of said one pulley when said stems are so caught and said belt is actuated for said movement, means extending across said path for obstructing movement of the cherries therepast thereby detaching the cherries from their stems, and means for holding each cherry in each hole during movement of said length to a point adjacent the engagement between said length and said one pulley.

11. A cherry stemmer comprising a pair of flat, generally horizontally elongated and disposed longitudinally aligned conveyors supported in engagement one over the other providing an upper and a lower conveyor, registering openings formed in said conveyors each registering pair being adapted to receive a cherry therein with its stem projecting upwardly or downwardly from the upper side of said upper conveyor or from the lower side of said lower conveyor respectively according to the position of said cherry, a pair of horizontally disposed rotary pulleys at one of the corresponding ends of said conveyors, said upper and said lower conveyors respectively extending below and above the upper and the lower pulleys of said pair of pulleys and partially around the sides of said pulleys in close engagement therewith, means for simultaneously moving said conveyors longitudinally thereof to and past said pulleys, means for supporting said cherries in said pairs of registering openings for movement with said conveyors to said pulleys for engagement of the projecting stems of said cherries between the upper and lower pulleys and said upper and lower conveyors according to the positions of said stems whereby said cherries will be drawn out of the opening in one or the other of said conveyors for movement partially around one or the other of said pulleys, and separate means respectively adjacent the sides of said pulleys around which said cherries are adapted to be so carried positioned for engagement with the said cherries for separating them from their stems.

12. A machine for stemming cherries comprising a pair of flat, generally horizontally elongated and disposed longitudinally aligned conveyors supported in substantial engagement one over the other providing an upper and a lower conveyor, registering openings formed in said conveyors each registering pair being adapted to receive a cherry therein with its stem projecting downwardly therefrom, the combined thickness of said pair of conveyors being substantially equal to the diameter of each cherry, a pair of horizontally disposed rotary pulleys at one of the corresponding ends of said conveyors, said upper and said lower conveyors respectively extending below and above the upper and lower pulleys of said pair and partially around the latter in engagement therewith, means for simultaneously moving said conveyors longitudinally thereof and past said pulleys, means for supporting said cherries in said pairs of registering openings for movement with said conveyors to said pulleys and with the upper sides of said cherries about even with the upper side of said upper conveyor for engagement of the downwardly projecting stems of said cherries between the lower pulley and the lower conveyor whereby the cherries will be drawn out of the openings in said upper conveyor and will project outwardly of the openings in said lower conveyor upon being carried partially around said lower pulley suspended from their stems, and means alongside said lower pulley positioned for engagement with the cherries so projecting from said lower conveyor for separating said cherries from their stems.

13. A machine for stemming cherries comprising a pair of flat, generally horizontally elongated and disposed longitudinally aligned conveyors supported in substantial engagement one over the other providing an upper and a lower conveyor, registering openings formed in said conveyors each registering pair being adapted to receive a cherry therein with its stem projecting upwardly therefrom, the combined thickness of said pair of conveyors being substantially equal to the diameter of each cherry, a pair of horizontally disposed rotary pulleys at one of the corresponding ends of said conveyors, said upper and said lower conveyors respectively extending below and above the upper and lower pulleys of said pair and partially around the latter in engagement therewith, means for simultaneously moving said conveyors longitudinally thereof to and past said pulleys, means for supporting said cherries in said pairs of registering openings for movement with said conveyors to said pulleys and with the upper sides of said cherries about even with the upper side of said upper conveyor for engagement of the upwardly projecting stems of said cherries, between the upper pulley and the upper conveyor whereby the cherries will be drawn out of the openings in said lower conveyor and will project outwardly of the openings in said upper conveyor upon being carried partially around said upper pulley suspended from their stems, and means alongside said upper pulley positioned for engagement with the cherries so projecting from said upper conveyor for separating said cherries from their stems.

14. A machine for stemming cherries comprising a pair of flat, generally horizontally elongated and disposed longitudinally aligned conveyors supported in substantial engagement one over the other providing an upper and a lower conveyor, registering openings formed in said conveyors each registering pair being adapted to receive a cherry therein with its stem projecting upwardly therefrom or downwardly according to the posion of the cherry, the combined thickness of said pair of conveyors being substantially equal to the diameter of each cherry, a pair of horizontally disposed rotary pulleys at one of the corresponding ends of said conveyors, said upper and said lower conveyors respectively extending below and above the upper and lower pulleys of said pair and partially around the latter in engagement therewith, means for simultaneously moving said conveyors longitudinally thereof to and past said pulleys, means for supporting said cherries in said pairs of registering openings for movement with said conveyors to said pulleys and with the upper sides of said cherries about even with the upper side of said upper conveyor for engagement of the upwardly projecting stems of said cherries between the upper pulley and the upper conveyor and for engagement of the downwardly projecting stems between the lower pulley and the lower conveyor, the combined thickness of said pair of conveyors being substantially equal to the diameter of each cherry, whereby said cherries will be drawn out of one or the other of the openings of each registering pair upon being carried around the upper or lower pulley of said pair according to whether the said stems project upwardly or downwardly and will then project outwardly of said upper or lower conveyor according to which is in engagement with its stem.

15. A machine for stemming cherries comprising a pair of flat, generally horizontally elongated and disposed longitudinally aligned conveyors supported in substantial engagement one over the other providing an upper and a lower conveyor, registering openings formed in said conveyors each registering pair being adapted to receive a cherry therein with its stem projecting upwardly therefrom, the combined thickness of said pair of conveyors being substantially equal to the diameter of each cherry, a pair of horizontally disposed rotary pulleys at one of the corresponding ends of said conveyors, said upper and said lower conveyors respectively extending below and above the upper and lower pulleys of said pair and partially around the latter in engagement therewith, means for simultaneously moving said conveyors longitudinally thereof to and past said pulleys, means for supporting said cherries in said pairs of registering openings for movement with said conveyors to said pulleys and with the upper sides of said cherries about even with the upper side of said upper conveyor for engagement of the upwardly projecting stems of said cherries, means for feeding cherries onto the upper side of said upper conveyor for entering said registering openings, and the means for supporting said cherries being elements partially extending across each pair of registering openings to permit the stems of cherries to project downwardly from the lower conveyor.

16. In a machine for stemming cherries and the like having a generally horizontally extending belt formed with a plurality of openings each of which is of a size to receive a single fruit unit therein from its upper side with its stem depending from its lower side and a pulley over which said belt extends with its lower side in engagement with said pulley whereby the downwardly projecting stems on said cherries will be gripped between said pulley and said belt upon said cherries being carried to said pulley, an element at each opening and adjacent said lower side movable with said belt and partially extending across each opening for supporting each cherry thereon for movement with said belt to said pulley and with the stems extending there past whereby the downwardly projecting stems will be gripped between said belt and said lower side.

17. In a machine for stemming cherries and the like having a generally horizontally extending belt formed with a plurality of openings each of which is of a size to receive a single fruit unit therein from its upper side with its stem depending from its lower side and a pulley over which said belt extends with its lower side in engagement with said pulley whereby the downwardly projecting stems on said cherries will be gripped between said pulley and said belt upon said cherries being carried to said pulley, an element at each opening and adjacent said lower side movable with said belt and partially extending across each opening for supporting each cherry thereon for movement with said belt to said pulley and with the stems extending therepast whereby the downwardly projecting stems will be gripped between said belt and said lower side, each of said elements being a section of an elongated flexible member extending longitudinally of said belt and past a plurality of said openings, said openings being in rows extending longitudinally of said belt.

18. In a fruit stemming machine having an endless belt formed with a plurality of openings each of which is of a size to receive a single fruit unit therein with its stem depending from each opening and pulleys over which said belt extends, said pulleys being horizontally disposed providing a generally horizontally extending upper run, means for feeding said fruit units to said upper run from above for depositing said units in said openings, means secured to said belt for movement therewith extending across a restricted portion of the underside of each of the openings in said upper run sufficient for supporting said units thereon within said openings leaving the remainder of each opening free for projection of the stem of each unit downwardly past said means and depending from said upper run, means for actuating said belt for movement of said upper run to one pulley of said pair with said cherries in said openings whereby the projecting stems will be gripped between said pulley and said belt, projections on said one pulley positioned for entering said openings upon said movement of said upper run, said projections being sufficiently smaller in diameter than said openings to pass said stems between the sides of said openings and said projections for being gripped between said belt and said one pulley without severing said stems, and the said projections extending from said one pulley a distance about equal to the thickness of said belt for pushing the cherries out of said openings while their stems are gripped between said one pulley and said belt.

19. In a fruit stemming machine having an endless belt formed with a plurality of openings each of which is of a size to receive a single fruit unit therein with its stem depending from each opening and pulleys over which said belt extends, said pulleys being horizontally disposed providing a generally horizontally extending upper run, means for feeding said fruit units to said upper run from above for depositing said units in said openings, means secured to said belt for movement therewith extending across a restricted portion of the underside of each of the openings in said upper run sufficient for supporting said units thereon within said openings leaving the remainder of each opening free for projection of the stem of each unit downwardly past said means and depending from said upper run, means for actuating said belt for movement of said upper run to one pulley of said pair with said cherries in said openings whereby the projecting stems will be gripped between said pulley and said belt, projections on said one pulley positioned for entering said openings upon said movement of said upper run, said projections being sufficiently smaller in diameter than said openings to pass said stems between the sides of said openings and said projections for being gripped between said belt and said one pulley without severing said stems, and the said projections extending from said one pulley a distance about equal to the thickness of said belt for pushing the cherries out of said openings while their stems are gripped between said one pulley and said belt, said means being elongated strips extending longitudinally of said belt centrally across said openings, and said projections each being formed with a recess for receiving each such strip to permit said projections to enter said openings.

20. In a fruit stemming machine having a belt formed with a plurality of openings each of which is of a size to receive a single fruit unit therein with its stems projecting from one side of each opening and a pulley over which said belt extends in engagement with the side of said belt from which each stem projects for gripping the outer projecting end of each stem between said belt and said pulley with the fruit projecting outwardly of the belt relative to the side engaged by said pulley, a roller alongside said pulley and belt positioned sufficiently close to said belt to engage each such projecting fruit unit for separating it from its stem when said belt is actuated for carrying said units around said pulley, means for supporting said units in said openings for movement of said units with said belt to said pulley, means for actuating said belt for said movement of the latter to and past said pulley, and power means connected with said roller for rotating it in a direction in which the side thereof adjacent to said belt will move in a direction opposite to the direction of movement of said belt.

21. In a fruit stemming machine having a belt formed with a plurality of openings each of which is of a size to receive a single fruit unit therein with its stems projecting from one side of each opening and a pulley over which said belt extends in engagement with the side of said belt from which each stem projects for gripping the outer projecting end of each stem between said belt and said pulley with the fruit projecting outwardly of the belt relative to the side engaged by said pulley, a roller alongside said pulley and belt positioned sufficiently close to said belt to engage each such projecting fruit unit for separating it from its stem when said belt is actuated for carrying said units around said pulley, means for supporting said units in said openings for movement of said units with said belt to said pulley, means for actuating said belt for said movement of the latter to and past said pulley, and power means connected with said roller for rotating it in a direction in which the side thereof adjacent to said belt will move in a direction opposite to the direction of movement of said belt, said roller being of relatively soft material and its diameter being a relatively small fraction of the diameter of said pulley.

22. In a fruit stemming machine having a belt formed with a plurality of openings each of which is of a size to receive a single fruit unit therein with its stems projecting from one side of each opening and a pulley over which said belt extends in engagement with the side of said belt from which each stem projects for gripping the outer projecting end of each stem between said belt and said pulley with the fruit projecting outwardly of the belt relative to the side engaged by said pulley, a roller alongside said pulley and belt positioned sufficiently close to said belt to engage each such projecting fruit unit for separating it from its stem when said belt is actuated for carrying said units around said pulley, means for supporting said units in said openings for movement of said units with said belt to said pulley, means for actuating said belt for said movement of the latter to and past said pulley, and power means connected with said roller for rotating it in a direction in which the side thereof adjacent to said belt will move in a direction opposite to the direction of movement of said belt, projections on said pulley positioned to enter each of said openings for positively moving the fruit unit therein outwardly for engagement of each unit with said roller.

23. In a machine for stemming cherries and the like having a pair of generally horizontally extending belts one over the other with their adjacent runs together and formed with registering openings when so together of a size adapted to admit a cherry in each pair of registering openings with the outer end of its stem projecting upwardly from the upper of said adjacent runs or downwardly from the lower of said adjacent runs according to whether the stem is directed upwardly or downwardly, a pair of pulleys at one end of each belt disposed one above the other and over each of which one of said belts extends in close engagement therewith for gripping said outer ends of the projecting stems between said belts and said pulleys when the cherries in said openings move with said belts to said pulleys, means for actuating said belts for said movement of said adjacent runs to said pulleys respectively, means for supporting said cherries in said openings during said movement, projections on said pulleys positioned to enter said openings during said movement for positively urging cherries in said openings outwardly of said belts when the stems of said cherries are between said belts and said pulleys, and a roller adjacent each belt at each pulley positioned for engagement with the cherries pushed outwardly of said openings for separating said cherries from their stems, and means for rotating said respective rollers in the same direction as the pulley adjacent thereto whereby the side of each pulley will move in a direction opposite to the direction of movement of the cherry carried by the pulley and belt adjacent thereto.

24. In a machine of the character described having a pair of endless belts disposed one above the other; a pair of pulleys of the same size spaced one above the other at one of the corresponding ends of said belts over which they extend, the upper belt and the lower belt of said pair respectively including a lower run and an upper run vertically spaced apart at the lower and upper sides of the upper and lower pulleys of said pair and extending convergently from said sides to a meeting point laterally spaced therefrom and similar portions of said runs then continuing in engaging parallel relationship for a substantial distance away from said point, means for actuating said belts for simultaneous movement of said runs to and over said pulleys, said belts being formed with perforations in register with each other at said portions each adapted to receive a single cherry therein with its stem projecting above or below said runs according to the position of the cherry, means below said lower run for supporting the cherries in said registering perforations for movement with said belts to said pulleys whereby said projecting stems will be engaged between said belts and said pulleys, projections on said pulleys positioned for entering said openings in said belts respectively when said projecting stems are between said belts and said pulleys for pushing the cherries in said perforations outwardly thereof and to reduce the likelihood of slippage of said belts relative to said pulleys, a pair of gears of the same size respectively coaxial with said pulleys secured thereto with their teeth in intermeshing relationship for spacing said pulleys and for causing said portions of said belts to move at the same rate of speed to said pulleys with their perforations in accurate registration, means at the point of meeting of said belts supporting said upper run in engagement with said lower run at said point.

25. In a machine of the character described having a pair of endless belts disposed one above the other; a pair of pulleys of the same size spaced one above the other at one of the corresponding ends of said belts over which they extend, the upper belt and the lower belt of said pair respectively including a lower run and an upper run vertically spaced apart at the lower and upper sides of the upper and lower pulleys of said pair and extending convergently from said sides to a meeting point laterally spaced therefrom and similar portions of said runs then continuing in engaging parallel relationship for a substantial distance away from said point, means for actuating said belts for simultaneous movement of said runs to and over said pulleys, said belts being formed with perforations in register with each other at said portions each adapted to receive a single cherry therein with its stem projecting above or below said runs according to the position of the cherry, means below said lower run for supporting the cherries in said registering perforations for movement with said belts to said pulleys whereby said projecting stems will be engaged between said belts and said pulleys, projections on said pulleys positioned for entering said openings in said belts respectively when said projecting stems are between said belts and said pulleys for pushing the cherries in said perforations outwardly thereof and to reduce the likelihood of slippage of said belts relative to said pulleys, a pair of gears of the same size respectively coaxial with said pulleys secured thereto with their teeth in intermeshing relationship for spacing said pulleys and for causing said portions of said belts to move at the same rate of speed to said pulleys with their perforations in accurate registration, means at the point of meeting of said belts supporting said upper run in engagement with said lower run at said point, said upper pulley being closer to said point than said lower pulley to prevent squeezing said cherries between projections on the upper and lower pulleys, the spacing between said runs at a point directly below the axis of said upper pulley being less than the diameter of a cherry and the combined thickness of said runs being about equal to said diameter.

26. In a machine of the character described, having a pair of endless belts disposed one above the other; a pair of pulleys at one of the corresponding ends of said belts over which they extend, the upper belt and the lower belt of said pair respectively including a lower run and an upper run having a similar portion of each in parallel engaging relationship for a substantial distance and then extending divergently from each other to said pulleys, means for actuating said belts for simultaneous movement of said portions at the same rate of speed to said pulleys, perforations formed in said belts positioned for registration along said portions each perforation being adapted to receive a single cherry therein with its stem projecting above or below said lower and upper runs according to its position within a registering pair of perforations, means below said upper run for supporting cherries in said perforations for movement with said belts to said pulleys, means for feeding cherries onto the engaging portions of said runs and a rotor extending across said portions between said pulleys and the point where cherries are fed onto said portions having vanes of relatively soft rubber-like material projecting radially therefrom and extending across said portions close to the latter, means for rotating said rotor for movement of the vanes nearest said portions in a direction opposite the direction of movement of said portions to said pulleys for preventing most of the cherries outside said perforation from being carried to said pulleys, the combined thickness of said runs being substantially equal to the diameter of a cherry whereby cherries in said registering openings will move past said rotor to said pulleys for gripping of their projecting stems between said pulleys and said belts.

27. In a machine of the character described, having a pair of endless belts disposed one above the other; a pair of pulleys at one of the corresponding ends of said belts over which they extend, the upper belt and the lower belt of said pair respectively including a lower run and an upper run having a similar portion of each in parallel engaging relationship for a substantial distance and then extending divergently from each other to said pulleys means for actuating said belts for simultaneous movement of said portions at the same rate of speed to said pulleys, perforations formed in said belts positioned for registration along said portions, each perforation being adapted to receive a single cherry therein with its stem projecting above or below said lower and upper runs according to its position within a registering pair of perforations, means below said upper run for supporting cherries in said perforations for movement with said belts to said pulleys, means for feeding cherries onto the engaging portions of said runs and a rotor extending across said portions between said pulleys and the point where cherries are fed onto said portions having vanes of relatively soft rubber-like material projecting radially therefrom and extending across said portions close to the latter, means for rotating said rotor for movement of the vanes nearest said portions in a direction opposite the direction of movement of said portions to said pulleys for preventing most of the cherries outside said perforation from being carried to said pulleys, the combined thickness of said runs being substantially equal to the diameter of a cherry whereby cherries in said registering openings will move past said rotor to said pulleys for gripping of their projecting stems between said pulleys and said belts, a roller above said portions and between said rotor and said pulleys positioned a distance from said portions substantially less than the diameters of said cherries to positively prevent the passage of any cherries on said portions and out of said openings from passing to said pulleys, means for rotating said roller for movement of its surface nearest said portions in a direction opposite to the direction of movement of the latter.

28. In a machine of the character described having a pair of generally horizontally extending conveyors disposed one above the other with their adjacent runs together and formed with perforations in registration with each other along said runs, the combined thickness of said belts being about equal to the diameter of a cherry and each pair of said registering openings being adapted to receive a cherry therein with the stems of the unstemmed cherries projecting above or below said runs according to whether their stems are directed upwardly or downwardly, an upper and a lower pulley at one of the corresponding ends of said belts over which said belts extend in engagement therewith for respectively gripping the upwardly and downwardly projecting stems between said pulleys and said belts whereby the cherries having stems thereon will be carried around said pulleys for release therefrom at the upper and lower sides of the upper and lower pulley respectively, and the cherries without stems will drop from said perforations by gravity upon movement of said belts around said pulleys, means below the lower of said adjacent runs for supporting the cherries within said registering openings with the downwardly projecting stems extending therepast, and separate receivers positioned for receiving the stemmed and unstemmed cherries when they are respectively dropped from said perforations and released from said pulleys.

29. In a fruit processing machine, a carrier having a plurality of apertures therein, means connected to progress said carrier to move said apertures over a fruit supporting path, means for delivering unstemmed fruit to the upper surface of said carrier, said apertures being larger in diameter than the majority of said fruit, fruit supporting means moving with said carrier and beneath said apertures along said path to prevent fruit from passing through said apertures, said fruit supporting means being located at a distance below the top of said carrier at said apertures not substantially less than the average diameter of the fruit being delivered to said carrier whereby all fruit of average diameter entering said aperture are progressed by said carrier with only the stem thereof projecting from the surface of said carrier, means for preventing fruit on said carrier, but not in said apertures, from passing a first position along said path, means for gripping said projecting stems at a second position along said path beyond said first position, said fruit supporting means terminating its recited relation to said carrier at a third position along said path to discontinue its support of said fruit, and means for applying relative movement between said stems and fruit at a fourth position to separate said fruit from said stems.

References Cited in the file of this patent

UNITED STATES PATENTS

| | | |
|---|---|---|
| 1,076,794 | Smith | Oct. 28, 1913 |
| 1,409,802 | Urschel | Mar. 14, 1922 |
| 1,409,803 | Urschel | Mar. 14, 1922 |
| 1,409,804 | Urschel | Mar. 14, 1922 |
| 1,734,788 | Babcock | Nov. 5, 1929 |
| 2,114,727 | Thys | Apr. 19, 1938 |
| 2,194,058 | Urschel | Mar. 19, 1940 |
| 2,243,530 | Kok | May 27, 1941 |

(Other references on following page)

UNITED STATES PATENTS

| | | |
|---|---|---|
| 2,318,805 | Silva | May 11, 1943 |
| 2,358,500 | Frova | Sept. 19, 1944 |
| 2,360,412 | Frova | Oct. 17, 1944 |
| 2,361,834 | Frova | Oct. 31, 1944 |
| 2,462,682 | Schubert | Feb. 22, 1949 |

FOREIGN PATENTS

| | | |
|---|---|---|
| 446,505 | France | Oct. 4, 1912 |
| 392,110 | Germany | Mar. 15, 1924 |
| 631,894 | France | Dec. 28, 1927 |
| 819,314 | France | July 5, 1937 |